Aug. 18, 1936.       M. LEVINE ET AL       2,051,727
PREFORMED MEDIA FOR BIOLOGICAL OXIDATION
Filed Oct. 21, 1935

Inventors:
Max Levine, William E. Galligan & Ralph H. Luebbers
by Bair, Freeman & Sinclair
Attorneys Patented Aug. 18, 1936

2,051,727

UNITED STATES PATENT OFFICE 2,051,727

PREFORMED MEDIA FOR BIOLOGICAL OXIDATION

Max Levine, William E. Galligan, and Ralph H. Luebbers, Ames, Iowa, assignors to the State of Iowa for Iowa State College of Agriculture and Mechanical Arts Application October 21, 1935, Serial No. 46,002

3 Claims. (Cl. 210—7)

Our invention relates to the provision of definitely shaped preformed media for use in the process of biological oxidation and to the art of using such media.

Our invention may be employed for the disposal of sewage and industrial waste and for the production of valuable organic and inorganic compounds, in any industrial process which is essentially a biological oxidation, such as the production of vinegar or acetic acid, from dilute ethyl alcohol solutions.

More particularly, it is our purpose to provide such media (and the art of using same) of ceramic or other material of such shape and size as to afford surface area for biological film, adequate air space and proper sizes of interstices (to reduce or retard clogging) for carrying on the process of biological oxidation with maximum efficiency and minimum ground acreage.

With these and other objects in view, our invention consists in the provision and use of definitely shaped preformed media, of which illustrations are shown in the accompanying drawings, in which.

Figure 1:
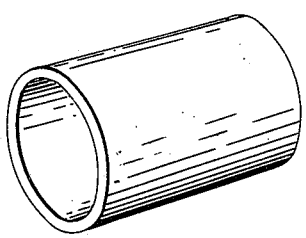
Figure 1 shows one form of such media, which we call a ring.
Figure 2:
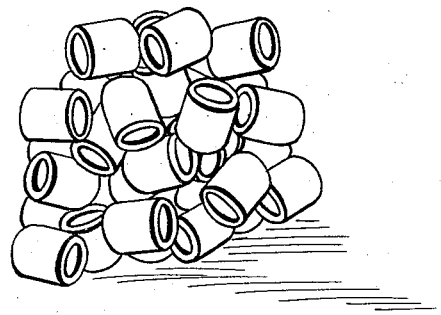
Figure 2 shows a number of such rings as installed.

While our media and art are available for a variety of uses, we have illustrated them in our following description, as applied to sewage disposal.

We shall first briefly describe the general process involved, so as to explain the problem which gave rise to our invention, and will then describe our contribution.

It is a common practice to treat sewage and other wastes by means of so-called trickling or sprinkling filters. In these filters, it is a practice to discharge the sewage on a filter bed composed of broken rock, which may be in the form of quartzite, granite, limestone, dolomite, or may be in the form of cinders or other products. Whatever the material, it has been the practice to crush it and screen it to rather designated sizes. It is obvious, however, that the shapes of the individual pieces must necessarily have wide variations. This product comprises the filter bed, which we speak of here as the filter medium.

As the sewage or waste passes through the filter bed, a microbial or biological film develops on the surface of the individual pieces of the medium. The treatment of the waste occurring in this process is the result of enzymic or other action of this biological film. It is postulated that the purification of the waste brought about by this process is a result of the life processes of the biological life present in the films, particularly under aerobic conditions.

The biological life present in the film feeds upon the unstabilized materials present in the waste to supply the needs of metabolism. Furthermore, this biological film, by a process not yet fully understood, brings about coagulation and flocculation of a considerable portion of the putrescible colloidal materials of the waste.

As the process continues, the thickness of the film increases until either the interstices of the filter are filled, or portions of the film loosen from the medium and slough off. It is obvious that for the continuity of the process, clogging should be eliminated.

It is essential to the operation of the process that oxygen or air should have free access to all of the surface of the filter medium.

It is generally held, and we have determined by research, that it is highly desirable that the filter media should have a maximum amount of exposed surface, and that there should be such a relation among the members as to afford maximum free air space per unit volume of media, and that there should be a maximum size of interstices to prevent clogging, and that the surface should exert no harmful influence upon the growth of the film. We are convinced that uniformity of size and shape of the filter material will contribute greatly toward securing an ideal filter medium.

It is obvious that the medium must have adequate mechanical strength and stability, and that the necessity for economy requires that the medium must be produced at a moderate price and should involve no great skill or special care for installation.

We find that the important things are those above set forth, surface area, maximum air space passage, and maximum size of interstices, and these features can be obtained by using filter media of various shapes, sizes and textures. For example, we have made tests with ceramic rings of uniform size and shape, to-wit: one inch in length and one inch in outside diameter with relatively thin walls, for example $\frac{1}{16}$ths of an inch thick. It will, of course, be understood that any material could be used which will have the desirable features above set forth. Other shapes may be used.

We are satisfied that the material should be definitely shaped and preformed. We have had the best results so far with uniform sizes of rings. Other shapes have been tested and found efficient.

It is important that the shape and size of the members of the medium should be such as to give large area for the formation of film and to permit adequate aeration and afford minimum opportunities for clogging.

We have found that the rings as described conform to these requirements, and that they are particularly well adapted for getting these results when dumped indiscriminately into the filter.

Where this medium is employed, a deeper filter can be used, and it is possible to accomplish a higher degree of purification and a greater amount of nitrification without resorting to forced ventilation because of the more uniform distribution of free air passages in the filter. In other words, the area of the filtering surface is greater and the distribution of surface area and interstices is more uniform, and the interstices are more uniformly adequate for aeration throughout the bed, than it is possible to acquire through the use of heterogeneous, irregularly shaped materials. The use of holes, perforations, projections or indentations in definitely preformed shapes gives the desired results.

With the use of definitely shaped preformed filter media, we have found that in the purification of sewage and after the customary ripening period, during which the microbial film was developed on the surface of the filter, there then resulted unusually high reductions in biochemical oxygen demand of the sewage. Furthermore, an unusual amount of nitrification occurred. There was much less tendency toward clogging than with the best crushed rock filter. There was greater regularity and uniformity of sloughing, than with a crushed rock filter, and there was evidence of better flocculation.

With a given cubic content of this filter medium, a larger proportion of the colloidal constituents of sewage is transformed into settleable solids.

On the whole, we have discovered that a much greater volume of waste can be handled by a given volume of filter where our filter medium is employed. Thus, for a given depth of filter, a smaller area of land would be required to effect the same degree of purification that is now obtained with crushed rock. This is true because the definitely shaped preformed media, even though they are simply dumped into place, afford, as compared with crushed rock or the like, a much greater available surface area, a freer air passage and a larger average interstitial size.

By way of illustration in our test made, it was found that a filter bed made of granite of a size commonly used for such purpose, to-wit, one and one-half inch to three inch (granite which would pass a three inch screen, but woud not pass a one and a half inch screen), the square feet of surface area per cubic foot of the granite was 29.98 and the percentage of voids was 45.3.

On the other hand, with rings one inch in outside diameter, and one inch in length and three-sixteenths inch walls, we found the square feet of surface area per cubic foot to be 52.2, and the percentage of voids to be 58.14. With a thinner wall, there was a very slight decrease in surface area, but the percentage of voids increased to about 67%. Furthermore, the filter medium, when made of burned clay, has no harmful influence of the growth of the film and permits flucculation and sloughing as mentioned.

We do not desire to limit ourselves to the use of specific shapes or specific materials, except in the claims, which are drawn to such specific shapes and materials, because various shapes and materials may be used, and it is our purpose to cover by our claims any such modifications of shape, size, structure or arrangement of the filter media, which may be reasonably within the scope of our invention and such claims.

We claim as our invention:

1. A medium for biological oxidation comprising definitely shaped preformed members in a filter bed to afford adequate surface for the formation of biological films and to provide sufficient free space for the passage of air, fluid and sluffings, without clogging and comprising rings substantially one inch long and one inch in exterior diameter and with walls approximately $\frac{3}{16}$ths of an inch thick.

2. A medium for biological oxidation comprising definitely shaped ceramic rings or hollow cylinders, piled indiscriminately and of such size as to approximate optimum conditions for biological oxidation without clogging and comprising members not greater than two and one-half inches in length and in diameter, and having holes of at least three-eighths of an inch in diameter.

3. A medium for biological oxidation comprising definitely shaped preformed members piled indiscriminately to afford adequate surface for the formation of biological films and to provide sufficient free space for the passage of air, fluid and sluffings without clogging, comprising members not greater than two and one-half inches in their largest dimensions, having recesses of at least three-eighths of an inch in diameter.

MAX LEVINE.
W. E. GALLIGAN.
RALPH H. LUEBBERS.